(12) United States Patent
Lavenu et al.

(10) Patent No.: US 11,396,956 B2
(45) Date of Patent: Jul. 26, 2022

(54) REGULATING VALVE WITH INTEGRATED PURGE FUNCTION

(71) Applicant: ARIANEGROUP SAS, Paris (FR)

(72) Inventors: Yoann Lavenu, Follainville (FR); Benoît Cazin, Paris (FR); Anthony Caron, Rouen (FR); Olivier Faye, Menilles (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 16/981,791

(22) PCT Filed: Mar. 22, 2019

(86) PCT No.: PCT/FR2019/050666
§ 371 (c)(1),
(2) Date: Sep. 17, 2020

(87) PCT Pub. No.: WO2019/186039
PCT Pub. Date: Oct. 3, 2019

(65) Prior Publication Data
US 2021/0116043 A1  Apr. 22, 2021

(30) Foreign Application Priority Data
Mar. 30, 2018  (FR) ........................ 1852824

(51) Int. Cl.
*F16K 31/524* (2006.01)
*B64G 1/40* (2006.01)
(Continued)

(52) U.S. Cl.
CPC ........ *F16K 31/52416* (2013.01); *B64G 1/401* (2013.01); *F02K 9/58* (2013.01); *F16K 11/165* (2013.01); *F16K 31/52408* (2013.01)

(58) Field of Classification Search
CPC ............. F16K 31/52416; F16K 11/165; F16K 31/52408; F16K 11/163; F02K 9/58; B64G 1/401
See application file for complete search history.

(56) References Cited

U.S. PATENT DOCUMENTS

| | | |
|---|---|---|
| 588,015 A | 8/1897 | Riggin |
| 3,770,016 A | 11/1973 | Johnstone et al. |

(Continued)

FOREIGN PATENT DOCUMENTS

| | | | | |
|---|---|---|---|---|
| GB | 342040 | | 1/1931 | |
| GB | 649778 A | * | 1/1951 | .......... F16K 11/0836 |

OTHER PUBLICATIONS

International Search Report issued in International Application No. PCT/FR2019/050666, dated May 31, 2019 (2 pages).
(Continued)

*Primary Examiner* — Atif H Chaudry
(74) *Attorney, Agent, or Firm* — Bookoff McAndrews, PLLC

(57) ABSTRACT

A valve includes a valve body provided with a plug, connected to an actuation system, an upstream duct, a downstream duct, and a purge duct provided with a shutter. The plug is movable in rotation about a longitudinal axis in the valve body, so that the rotation of the plug according to a first angular sector defines a flow between the upstream duct and the downstream duct, the rotation of the plug according to a second angular sector separate from the first angular sector shuts off the connection between the upstream duct and the downstream duct, and the rotation of the plug according to a third angular sector included in the second angular sector actuates the shutter so as to allow a flow from the upstream duct to the purge duct.

3 Claims, 4 Drawing Sheets

(51) Int. Cl.
*F16K 11/16* (2006.01)
*F02K 9/58* (2006.01)

(56) References Cited

U.S. PATENT DOCUMENTS

| | | |
|---|---|---|
| 2008/0105845 A1 | 5/2008 | Yeary |
| 2015/0129788 A1 | 5/2015 | Hansen, III |
| 2016/0053914 A1* | 2/2016 | Jing .................... F16K 17/363 251/129.01 |
| 2018/0259085 A1* | 9/2018 | Jing .................... B65D 88/54 |
| 2020/0191070 A1* | 6/2020 | Cho .................. F16K 31/5286 |

OTHER PUBLICATIONS

Search Report issued in French Application No. 1852824, dated Nov. 27, 2018 (2 pages).

* cited by examiner

REGULATING VALVE WITH INTEGRATED PURGE FUNCTION

CROSS-REFERENCE TO RELATED APPLICATIONS

This application is the U.S. national phase entry under 35 U.S.C. § 371 of International Application No. PCT/FR2019/050666, filed on Mar. 22, 2019, which claims priority to French Patent Application No. 1852824, filed on Mar. 30, 2018.

FIELD OF THE INVENTION

The present disclosure relates to control valves used in particular for the regulation of the flow rate of a cryogenic fluid of a spacecraft.

STATE OF THE PRIOR ART

The systems for regulating the flow rate of cryogenic propellants used in spacecrafts must allow performing flow rate regulation and purge functions.

These functions are commonly performed by distinct devices. A plug valve performs the flow rate regulation function, while a purge valve performs the purge function. However, such a configuration requires the use of multiple distinct pieces of equipment, which leads to a complexification of the structure (which then comprises in particular two actuation systems and two architectures of associated valve and body), as well as an increase in the associated mass, space requirement and costs.

The present disclosure thus aims to at least partially respond to these issues.
U.S. Pat. No. 3,770,016 A discloses a ball valve provided with a purge duct and suitable for water. Document US 2015/0129788 A1 discloses a ball valve suitable for cold or cryogenic fluids.

PRESENTATION OF THE INVENTION

The present disclosure relates to a valve for controlling the flow rate of a cryogenic fluid in a duct, comprising:
 a valve body provided with a plug connected to an actuation system,
 an upstream duct,
 a downstream duct,
 a purge duct provided with a shutter,
the upstream duct and the downstream duct opening into the valve body,
the purge duct being connected to the upstream duct, and the shutter being configured so as to be, by default, in a shut-off position of the purge duct,
the plug being movable in rotation along a longitudinal axis in the valve body, so that:
 the rotation of the plug according to a first angular sector defines a flow between the upstream duct and the downstream duct via the valve body,
 the rotation of the plug according to a second angular sector separate from the first angular sector shuts off the connection between the upstream duct and the downstream duct (or the internal volume of the valve body),
 the rotation of the plug according to a third angular sector included in the second angular sector actuates the shutter so as to allow a flow from the upstream duct to the purge duct.

According to one example, the plug is configured such that the flow between the upstream duct and the downstream duct via the valve body regulated by the rotation of the plug according to the first angular sector has pressure drops as a function of the rotation of the plug.

According to one example, the plug has a lug arranged on an outer surface of the plug, the lug being configured, when the plug is driven in rotation in the third angular sector, to come into contact and cause an actuation of the shutter so as to allow a flow from the upstream duct to the purge duct.

According to one example, the plug has an opening whose section increases from a first end to a second end, said opening being arranged about the axis of rotation of the plug.

The present disclosure also relates to a spacecraft comprising such a valve.

BRIEF DESCRIPTION OF THE DRAWINGS

The invention and its advantages will be better understood upon reading the detailed description given below of various embodiments of the invention given by way of non-limiting examples. This description refers to the pages of appended figures, on which.

In all of the figures, the identical elements are identified by common reference numerals.

DETAILED DESCRIPTION OF EXEMPLARY EMBODIMENTS

A valve is described hereinafter according to one aspect of the invention with reference to the figures.

Figure 1:
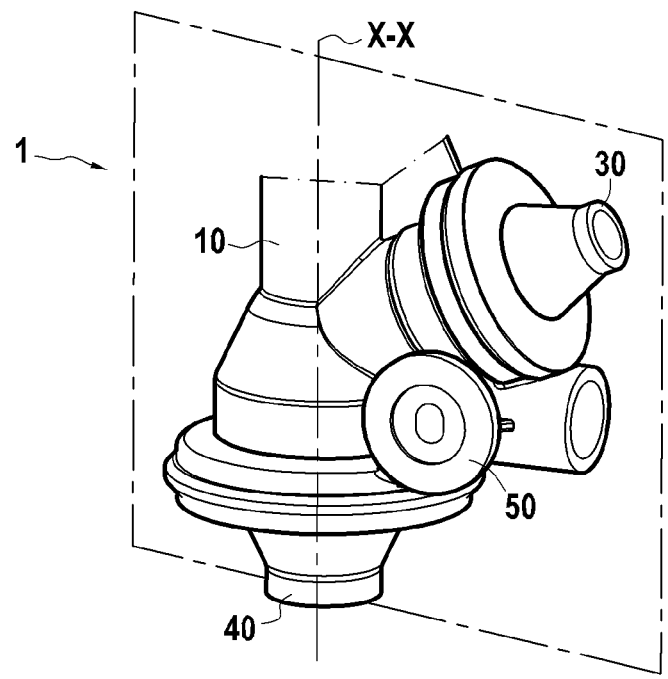
FIG. 1 represents a view of a valve according to one aspect of the invention.
Figure 2:
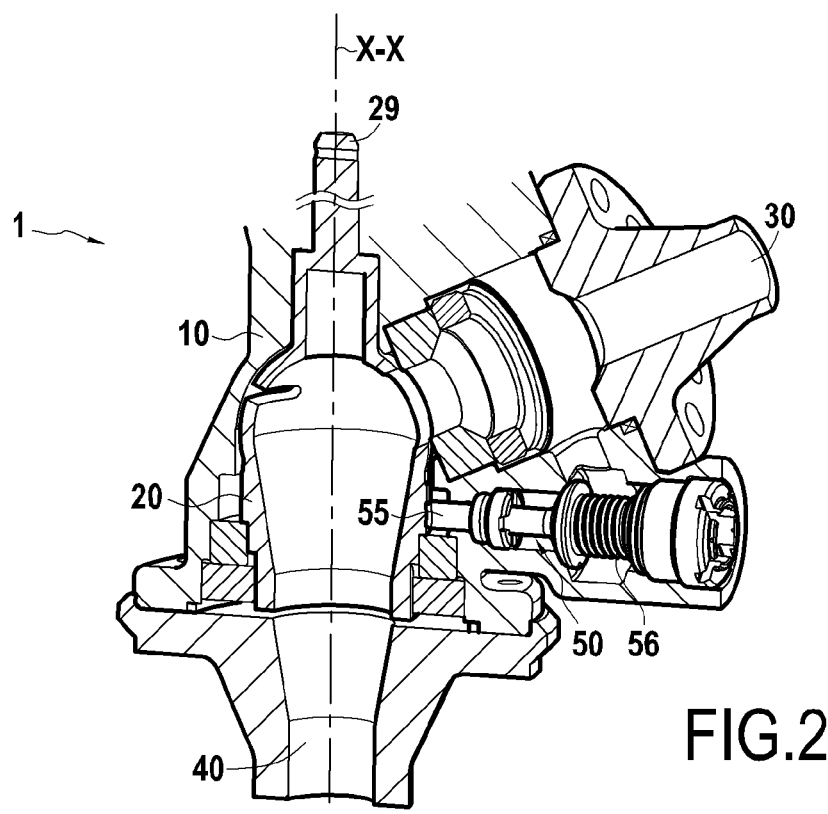
FIGS. 2 and 3 are sectional views of the valve represented in FIG. 1.
Figure 3:
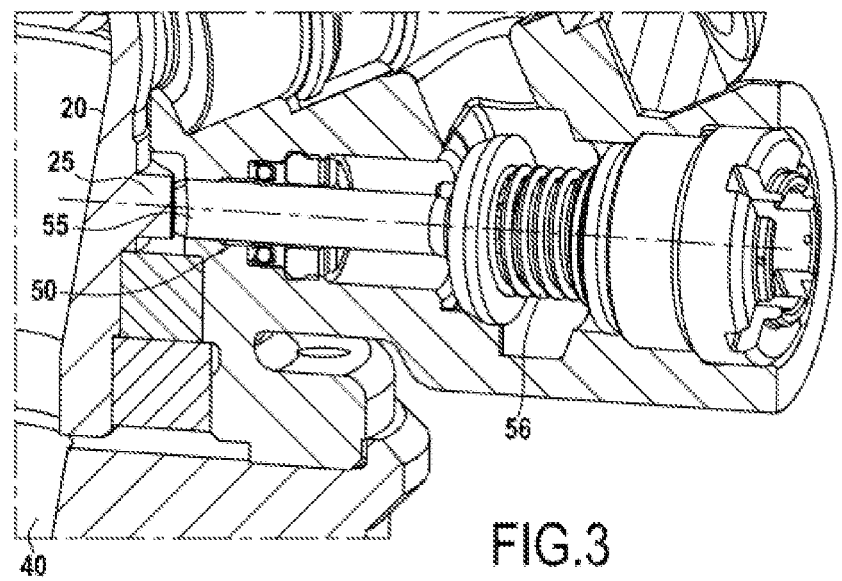
Figure 4:
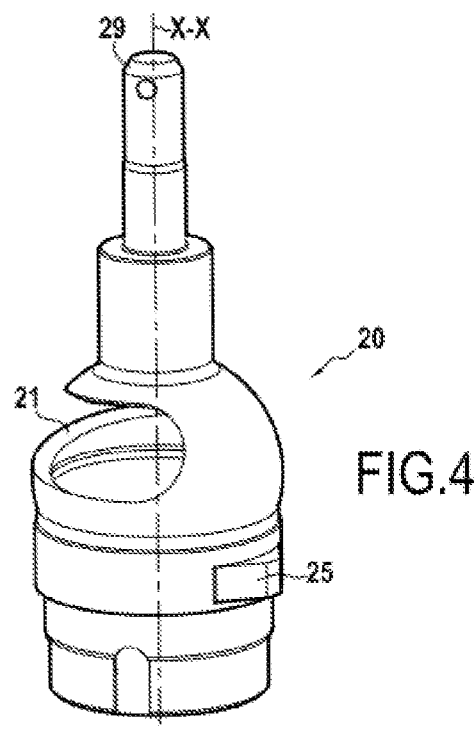
FIG. 4 illustrates the plug of the valve taken separately.

FIG. 1 represents a view of a valve according to one aspect of the invention, FIG. 2 represents a sectional view thereof, and FIG. 3 is a detailed sectional view of a specific area of the valve.

The valve 1 comprises a valve body 10 in which a plug 20 is mounted, and to which an upstream duct 30, a downstream duct 40, a purge duct 50, and a shutter 55 are connected.

The designations "upstream duct" and "downstream duct" are used depending on the operation envisaged for the valve 1. The upstream duct 30 is intended to be connected to a fluid supply source (for example a cryogenic propellant) such as a tank or a turbopump, and the downstream duct 40 is intended to be connected to a propulsion member of a spacecraft, such as a gas generator.

The upstream duct 30 and the downstream duct 40 are thus fluidly connected to an internal volume of the valve body 10.

The plug 20 is mounted in the internal volume of the valve body 10, and fulfills a function of selective shut-off of the fluid communication between the upstream duct 30 and the downstream duct 40.

The plug 20 thus typically has a generally cylindrical shape of revolution about an axis of rotation X-X. It has a through-opening 21 arranged on its wall, the opening 21 being adapted to be able to be aligned with the portion of the upstream duct 30 opening into the internal volume of the valve body 10. This opening 21 arranged in the plug 20 has a variable section as a function of the angular sector about the axis X-X, typically an opening section increasing from a first end to a second end, so that a rotation of the plug 20 within the valve body 10 about the axis X-X allows controlling the fluid flow rate which can pass from the upstream duct 30 to the internal volume of the valve body 10, and therefore more generally from the upstream duct 30 to the downstream duct 40.

Thus, the rotation of the plug 20 about the axis X-X via an actuation system (not represented) allows controlling the pressure drops generated by the plug 20, and therefore the fluid flow rate passing from the upstream duct 30 to the downstream duct 40. Note however that the opening 21 extends over an angular sector less than 360°, the remaining angular sector thus allows making a shut-off of the connection between the internal volume of the valve body 10 and the upstream duct 30. The plug 20 can be connected to the actuation system (not represented) via the end 29 of the plug 20 which is opposite to the downstream duct 40.

The valve 1 as proposed exploits this angular sector by positioning therein a lug 25 extending from the outer surface of the plug 20, typically positioned so as to be facing the purge duct 50 and thus allow actuating a shutter 55 of the purge duct 50 as described below.

The purge duct 50 is formed so as to allow connecting the upstream duct 30 to a purge line (not represented). The purge duct is thus fluidly connected to the upstream duct 30, the connection being made upstream of the junction between the upstream duct 30 and the internal volume of the valve body 10, and therefore upstream of the plug 20. A shutter 55 is slidably mounted in the purge duct 50, so as to selectively shut it off. This shutter 55 is associated with a return element 56, typically a spring, ensuring a default holding of the shutter 55 in the shut-off position.

The shutter 55 has a rod whose end opens into the internal volume of the valve body 10. This rod is positioned so as to be able to be actuated by the lug 25 formed on the plug 20 when the rotation of the plug 20 is made according to a defined angular sector. The lug 25 then exerts a pushing force on the shutter 55 to make it slide in the purge duct 50 while opposing the force exerted by the return element 56, and thus allow a passage of fluid from the upstream duct 30 to the purge duct 50.

When the plug 20 rotates such that the lug 25 is no longer in contact with the shutter 55, the latter is brought back to the shut-off position due to the return element 56.

The lug 25 typically has a central section from which a functional ramp of the lug 25 extends, such that the continuous rotation in the same direction of the plug 20 about the axis X-X brings the shutter 55 into contact with this functional ramp, then with its central section (corresponding to the maximum displacement). Such geometry allows regulating the movement of the shutter 55 and therefore the opening of the purge duct 50.

Thus, the valve 1 as proposed allows, as a function of the angular position of the plug 20, regulating the flow rate passing from the upstream duct 30 to the downstream duct 40, shutting off the passage of the fluid from the upstream duct 30 to the downstream duct 40, or performing a purge of the upstream duct 30 via the purge duct 50.

Figure 7:
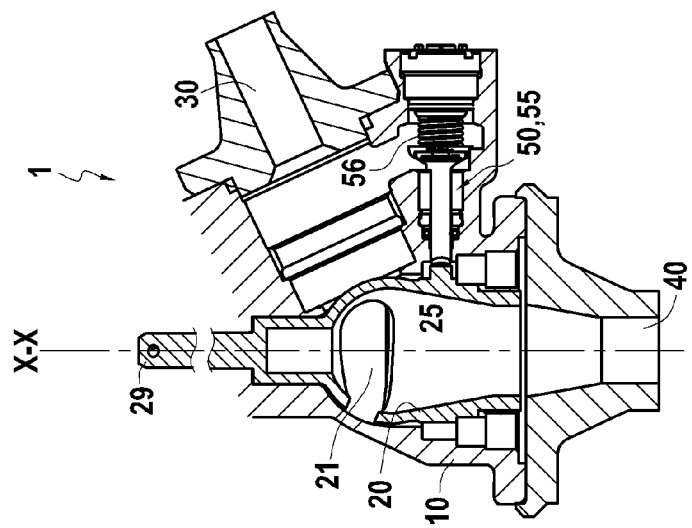
FIGS. 5, 6 and 7 represent different states of the valve during its operation.
Figure 6:
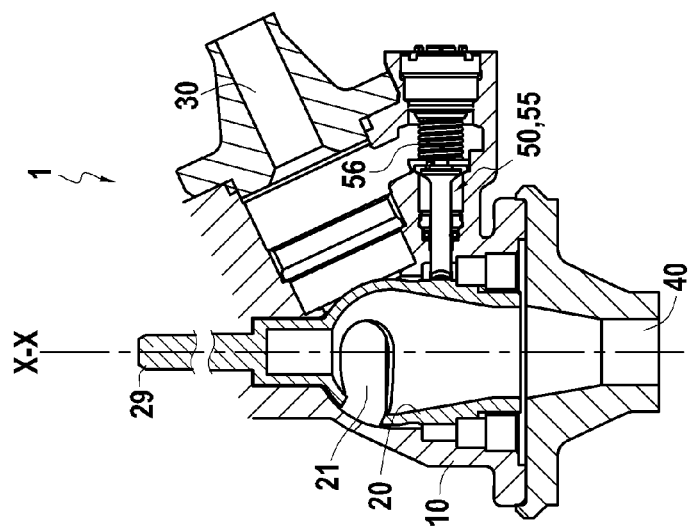
Figure 5:
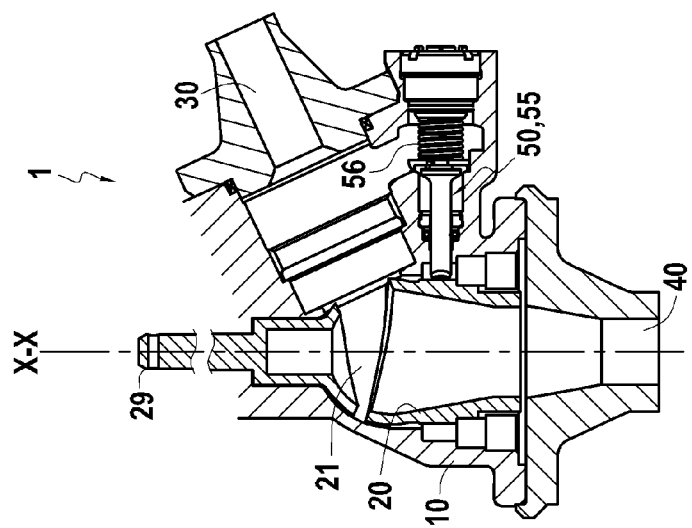

These different configurations are thus represented in FIGS. 5 to 7. In FIGS. 3 and 5 to 7, in order not to overload the drawing, the various seals ensuring the sealing of the valve 1, in particular when it shuts off the passage of the fluid from the upstream duct 30 to the downstream duct 40, are not represented.

Figure 8:
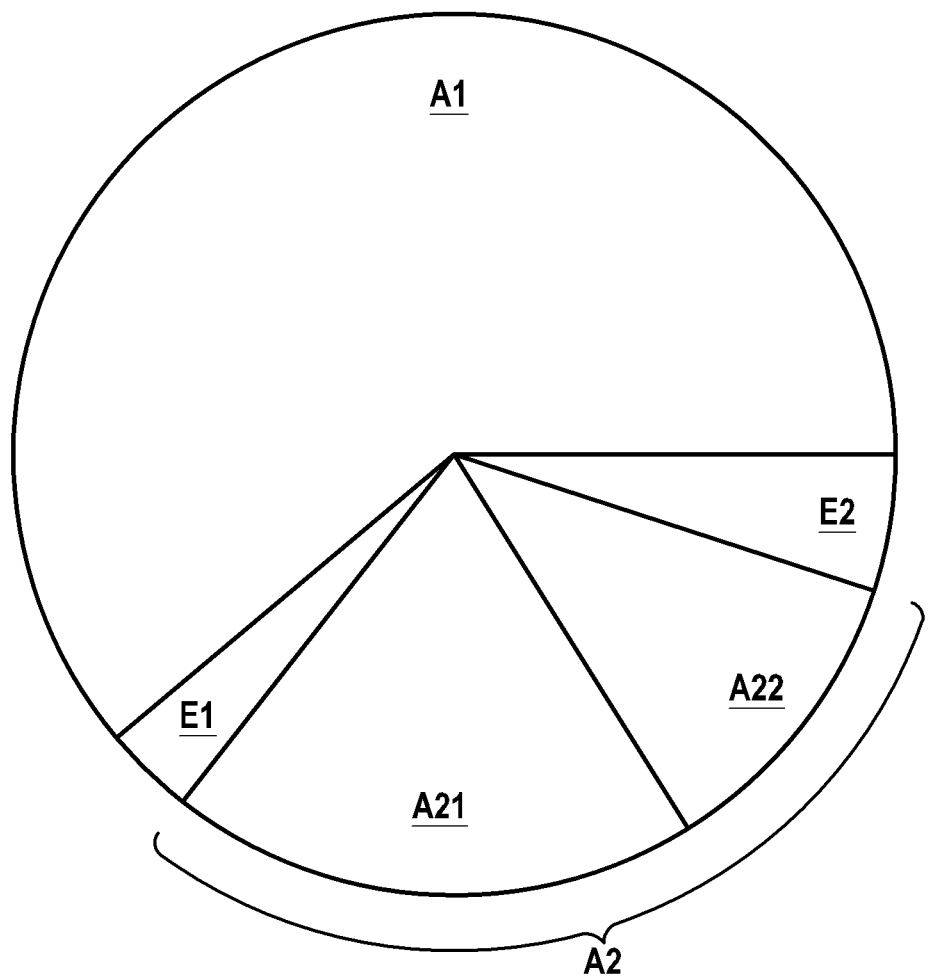
FIG. 8 is a diagram schematizing the different angular sectors in relation to FIGS. 5 to 7.

In order to illustrate the operation thereof, a diagram is represented in FIG. 8 with different angular sectors to schematize the rotation of the plug 20 and the different configurations of the valve 1.

A first angular sector A1 is considered, which corresponds to an area of regulation of the flow rate passing from the upstream duct 30 to the downstream duct 40 via the plug 20, and more specifically thanks to the scalable opening 21 made in the plug 20, which corresponds to the configuration represented in FIG. 5.

A second angular sector A2 separate from the first angular sector A1 corresponds to the configuration in which the plug 20 shuts off the upstream duct 30. The second angular sector A2 and the first angular sector A1 are represented as being separated by sealing areas E1 and E2.

The sealing area E1 defines a margin between the closed position of the valve 1 and its opening via the opening 21 of the plug.

The sealing area E2 is for its part a non-functional area, which can form an abutment between the position corresponding to the valve 1 having a maximum or a minimum opening, and the position corresponding to the valve 1 closed and to the purge duct 50 open.

The cumulative amplitude of the angular sectors A2, E1 and E2 contributes to the good mechanical strength of the plug 20, and must therefore be sufficient to ensure good rigidity of the plug 20.

Within the second angular sector A2, a first sub-sector A21 and a second sub-sector A22 are distinguished. The first sub-sector A21 corresponds to the configuration in which the plug 20 shuts off the upstream duct 30, and the lug 25 is not in contact with the shutter 55 (the purge duct 50 is then shut off), which corresponds to the configuration represented in FIG. 6. The second sub-sector A22 corresponds to the configuration in which the plug 20 shuts off the upstream duct 30, and the lug 25 is in contact with the shutter 55 in order to control the opening of the purge duct 50, which corresponds to the configuration represented in FIG. 7, that is to say a purge action while maintaining the passage from the upstream duct 30 to the downstream duct 40 shut off.

Therefore to summarize, the valve 1 as proposed allows accumulating flow rate regulation and purge functions within a single equipment, by exploiting an angular range of rotation of the plug 20 which remains unexploited in the existing systems.

It will also be noted that the actuation in rotation of the plug 20 as described above, and therefore the control of the valve 1, can be performed by a single actuation system.

The valve 1 as proposed or more specifically the valve body 10 is typically made by additive manufacturing.

The invention claimed is:

1. A valve for controlling the flow rate of a cryogenic fluid in a duct, comprising:
   a valve body provided with a plug, the plug being connected to an actuation system,
   an upstream duct,
   a downstream duct,
   a purge duct provided with a shutter,
   the upstream duct and the downstream duct opening into the valve body, the purge duct being connected to the upstream duct, and the shutter being configured so as to be, by default, in a shut-off position of the purge duct, the plug being movable in rotation about a longitudinal axis in the valve body, so that:
   the rotation of the plug according to a first angular sector defines a flow between the upstream duct and the downstream duct via the valve body, the rotation of the plug according to a second angular sector separate from the first angular sector shuts off the connection between the upstream duct and the downstream duct, the rotation of the plug according to a third angular sector included in the second angular sector actuates the shutter so as to allow a flow from the upstream duct to the purge duct, the plug having an opening whose section increases from a first end to a second end, said opening being arranged about the axis of rotation of the plug, and the plug having a lug arranged on an outer surface of the plug, the lug being configured, when the plug is driven in rotation in the third angular sector, to come into contact and actuate the shutter so as to allow a flow from the upstream duct to the purge duct.

2. The control valve according to claim 1, wherein the plug is configured such that the flow between the upstream duct and the downstream duct via the valve body regulated by the rotation of the plug according to the first angular sector has pressure drops as a function of the rotation of the plug.

3. A spacecraft comprising a valve according to claim 1.

* * * * *